United States Patent
Sielermann et al.

(10) Patent No.: US 9,988,220 B2
(45) Date of Patent: Jun. 5, 2018

(54) METHOD AND APPARATUS FOR FEEDING ITEMS OF LAUNDRY TO A MANGLE OR TO SOME OTHER LAUNDRY-TREATMENT ARRANGEMENT

(71) Applicant: Herbert Kannegiesser GmbH, Vlotho (DE)

(72) Inventors: Jürgen Sielermann, Heubach (DE); Wilhelm Bringewatt, Porta Westfalica (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 99 days.

(21) Appl. No.: 14/950,296

(22) Filed: Nov. 24, 2015

(65) Prior Publication Data

US 2016/0145055 A1  May 26, 2016

(30) Foreign Application Priority Data

Nov. 26, 2014  (DE) .......................... 10 2014 017 477

(51) Int. Cl.
*B65G 47/90* (2006.01)
*D06F 67/04* (2006.01)
*D06F 93/00* (2006.01)

(52) U.S. Cl.
CPC ............. *B65G 47/90* (2013.01); *D06F 67/04* (2013.01); *D06F 93/00* (2013.01)

(58) Field of Classification Search
CPC ......... B65G 47/90; D06F 67/04; D06F 93/00; D06F 95/00–95/008; D06C 3/00
See application file for complete search history.

(56) References Cited

U.S. PATENT DOCUMENTS 4,106,227 A * 8/1978 Allen ...................... D06F 67/04
38/143
4,378,645 A * 4/1983 Allen ...................... D06F 67/04
38/8

(Continued)

FOREIGN PATENT DOCUMENTS

DE           19504948 A1    8/1996
DE       102008028120 A1   12/2009
(Continued)

OTHER PUBLICATIONS

European Patent Office, Europaischer Recherchenbericht (search report on related application), dated Apr. 5, 2016.

*Primary Examiner* — Ismael Izaguirre
(74) *Attorney, Agent, or Firm* — Laurence P. Colton; Smith Tempel Blaha LLC

(57) ABSTRACT

Items of laundry are fed from an input machine to a mangle or some other laundry-treatment arrangement. Operating personnel are employed to feed the input machine with the items of laundry. This is costly in terms of time and personnel. The invention makes provision for determining surface profiles of the items of laundry by means of imaging installations. From these surface profiles a location for the automatic gripping of the item of laundry or of a corner of same, and preferably also the position of the location or corner, is determined by electronic image processing, whereby the location or corner of the item of laundry can be securely gripped in an automatic and targeted manner. By virtue of the described measures, hitherto manual activities in front of the input machine can be easily performed in a reliable and fully-automatic mode.

24 Claims, 3 Drawing Sheets

(56) References Cited

U.S. PATENT DOCUMENTS

| | | | | |
|---|---|---|---|---|
| 4,979,868 | A * | 12/1990 | Ueda | B61B 10/025 |
| | | | | 38/12 |
| 6,826,856 | B1 * | 12/2004 | McCabe | D06F 67/04 |
| | | | | 38/143 |
| 7,524,145 | B2 * | 4/2009 | Heinz | B65G 51/02 |
| | | | | 406/116 |
| 7,836,617 | B2 * | 11/2010 | McCabe | D06F 67/04 |
| | | | | 38/143 |
| 2005/0028409 | A1 * | 2/2005 | McCabe | D06F 67/04 |
| | | | | 38/143 |
| 2009/0266749 | A1 * | 10/2009 | Heinz | D06F 93/00 |
| | | | | 209/580 |
| 2012/0099947 | A1 * | 4/2012 | Heinz | D06F 93/00 |
| | | | | 414/13 |
| 2012/0308339 | A1 * | 12/2012 | McCabe | B66C 1/58 |
| | | | | 414/13 |
| 2014/0291123 | A1 * | 10/2014 | Olivieri | D06F 67/04 |
| | | | | 198/617 |
| 2015/0292142 | A1 * | 10/2015 | Tautz | B25J 11/00 |
| | | | | 414/800 |
| 2017/0073881 | A1 * | 3/2017 | Bringewatt | D06F 67/04 |

FOREIGN PATENT DOCUMENTS

| | | | |
|---|---|---|---|
| EP | 0372320 | A2 | 6/1990 |
| EP | 2113606 | A2 | 11/2009 |
| EP | 2444544 | A2 | 4/2012 |
| EP | 2930264 | A1 | 10/2015 |

* cited by examiner

METHOD AND APPARATUS FOR FEEDING ITEMS OF LAUNDRY TO A MANGLE OR TO SOME OTHER LAUNDRY-TREATMENT ARRANGEMENT

CROSS REFERENCE TO RELATED APPLICATIONS

This patent application claims the benefit of and priority on German Patent Application No. 10 2014 017 477.8 having a filing date of 26 Nov. 2014.

BACKGROUND OF THE INVENTION

Technical Field

The invention relates to a method for feeding items of laundry to a mangle or to some other laundry-treatment arrangement, wherein an item of laundry is gripped, said item of laundry is spread out at two adjacent corners of a front edge and deposited with said front edge on a feed conveyor which transports the item of laundry to the mangle or to some other laundry-treatment arrangement, and to a method for feeding items of laundry to a mangle or to some other laundry-treatment arrangement, wherein an item of laundry is gripped and said item of laundry is spread out at two adjacent corners of a front edge and transported with this front edge as the leading edge to the laundry-treatment arrangement.

Furthermore, the invention relates to an apparatus for feeding items of laundry to a mangle or some other laundry-treatment arrangement with a transport system having moveable clamps for holding a respective corner of an item of laundry, to an apparatus for feeding items of laundry to a laundry-treatment arrangement in which the transport system is assigned at least one pair of rollers for the passage of at least one part of an item of laundry and that the two rollers of the pair of rollers can rotate about parallel, upright axes of rotation, and to an apparatus for feeding items of laundry to a laundry-treatment arrangement in which the transport system is assigned at least one pair of rollers for the passage of at least one part of an item of laundry and that the two rollers of the pair of rollers can rotate about parallel axes of rotation that can be brought at least into a nearly upright position.

Prior Art

After being washed and dried, items of laundry are ironed in a mangle as so-called dry laundry, where they are freed of residual moisture or immediately folded in a folding device. The items of laundry must be fed to the mangle, folding device or some other laundry-treatment arrangement in a spread-out state. This is carried out mechanically by means of input machines. Said input machines are equipped with a feed conveyor, which feeds the spread-out item of laundry lying on it into the mangle or some other laundry-treatment arrangement.

The items of laundry are fed into the input machine individually, for example by being placed on the feed conveyor or hung on spreading clamps which spread out the item of laundry in front of the feed conveyor and deposit it on the latter. The hanging of the individual items of laundry on the clamps of the input machine as well as the direct placement of each individual item of laundry on the feed conveyor has been hitherto carried out manually. This is costly in terms of time and personnel. Attempts have been made to automate these activities. They have mostly failed due to the difficulty of automatically locating and gripping adjacent edges of a front edge of items of laundry in a reliable manner with a reasonable expenditure of mechanical investment.

BRIEF SUMMARY OF THE INVENTION

The object of the invention is therefore to provide a method and apparatus by means of which items of laundry can be fed automatically to a mangle, folding machine or some other laundry-treatment arrangement in a simple and reliable manner.

A method for achieving the object stated at the beginning is a method for feeding items of laundry to a mangle or to some other laundry-treatment arrangement, wherein an item of laundry is gripped, said item of laundry is spread out at two adjacent corners of a front edge and deposited with said front edge on a feed conveyor which transports the item of laundry to the mangle or to some other laundry-treatment arrangement, characterized in that a surface profile of at least one item of laundry is recorded, from which a location to be gripped on the item of laundry is determined and the item of laundry is then gripped at this location. Accordingly, provision is made to record a surface profile of the respective item of laundry or a plurality of said items of a pile of laundry to be fed. On the basis of the preferably three-dimensional surface profile, it is possible to determine or select, in particular by means of image analysis, an intended or easily accessible location on the respective item of laundry to be fed to the laundry-treatment arrangement and/or to determine the position of this location. The item of laundry can then be securely gripped at this location automatically.

It is preferably provided that a multidimensional, if appropriate a three-dimensional, image is generated by imaging processes or devices. By virtue of an appropriate, preferably electronic image analysis, it is possible to determine the intended or most easily accessible location on the item of laundry, for example the coordinates of such a location, which can then be approached by an appropriate lifting or gripping means, for example a clamp, a gripper or a suction device, which then grip the item of laundry at the intended location or at the location that has been determined to be the preferred one. Thus, the intended or most favorable location for gripping the respective item of laundry can be determined automatically and subsequently this location can also be approached automatically by the appropriate means and automatically gripped. This thereby eliminates the hitherto manual work steps required to feed items of laundry to a laundry-treatment arrangement.

The surface profile of each item of laundry, or also of a plurality of items of laundry lying or jumbled in a pile, is preferably determined by three-dimensional imaging means, for example by at least one 3D camera or a laser scanner. This results in a three-dimensional image of the respective item of laundry. Through image analysis, in particular by electronic and/or computational means, it is possible to determine the coordinates of the searched location, preferably a corner, or the particularly favorable location for gripping the item of laundry. By approaching in a targeted manner the location or corner thus determined, the appropriate lifting or gripping means can reliably grip the item of laundry where it can be gripped most conveniently and/or where it is intended to be gripped.

If an arbitrary location on the item of laundry is to be gripped, this is carried out in that, based on the determined surface profile, in particular a three-dimensional surface profile, which represents a kind of topography, the location having the largest curvature gradient is gripped. At this location one part, so to speak, of the irregularly lying or arbitrarily oriented item of laundry sticks out or projects from a pile containing a plurality of items of laundry. The item of laundry can then be reliably and fully-automatically grabbed at this location by mechanical means.

It is additionally preferred that the item of laundry be gripped at such a corner which has been identified to be the most accessible for a gripper or some other gripping means on the basis of the evaluation of the determined, preferably three-dimensional surface profile. The determination of the surface profile therefore not only identifies at least one corner of the item of laundry but also establishes which corner of the item that can be best gripped.

A preferred option for the further design or development of the method provides that, alternatively or in addition, the surface profile of an item of laundry hanging from a fastening means of the apparatus is determined and, based on this surface profile, the item of laundry is gripped at another free corner in a targeted manner, for example by means of another fastening means. This therefore results in the automatic gripping of two locations, and if required at two corners of the item of laundry.

It is also conceivable, by means of the recorded surface profile of an item of laundry hanging by a corner from a fastening means, to locate the corner adjacent to this corner and to grip it in a targeted manner. This makes it easily possible to grip an item of laundry automatically at adjacent corners of an edge, this edge preferably being a leading front edge with which the item of laundry is fed to the laundry-treatment arrangement.

One preferred design of the method provides that, on the basis of the determined surface profile or topography of the item of laundry, it is possible to identify the orientation of the hem of said item of laundry. It is thereby possible to establish on which side of the item of laundry a narrow, marginal strip, which is folded over during the formation of the hem in the item of laundry, is located. On the basis of the location of the hem as known from the evaluation of the determined surface profile, it is possible to feed the item of laundry to the laundry-treatment arrangement, in particular to place it on a feed conveyor, in such an orientation that the hem purposefully lies facing up or down, thereby assuming the intended position or orientation. This orientation of the hem during manual feeding of the laundry-treatment arrangement or input machine used to be performed by a human operator. That could lead to faulty feeding inputs. Due to the invention's automated method, such faulty feed inputs are no longer possible.

A further method for achieving the object set forth at the beginning, whereby this can also be a preferred further development of the previously described method, is a method for feeding items of laundry to a mangle or to some other laundry-treatment arrangement, wherein an item of laundry is gripped and said item of laundry is spread out at two adjacent corners of a front edge and transported with this front edge as the leading edge to the laundry-treatment arrangement, characterized in that, in the case of an item of laundry hanging down from a held corner, a lowest corner of said item of laundry is gripped and stretched, whereby the other corners of the item of laundry are formed such that they assume positions that can be gripped. Accordingly, provision is made that, in the case of an item of laundry held at one corner, the lowest point of the item of laundry hanging down by a corner is gripped and the item of laundry is then stretched, in particular only lightly stretched, as these corners are moved apart. This causes the remaining corners of the item of laundry to be configured such that they assume a position which can be gripped and/or which is suitable for image acquisition. The item of laundry can then be automatically gripped also at such a corner formed in this manner, after which the item of laundry is held at the targeted corners, preferably adjacent corners of a front edge.

It can be advantageous to design the method such that the item of laundry held at diagonally opposite corners is stretched. This then forms two free corners that are adjacent to each of the held corners. This makes it easily possible to determine automatically the adjacent corners of the item of laundry and subsequently to grip them mechanically in a targeted manner.

Another possibility offered by the advantageous further development of the method provides for the automatic determination, preferably by means an imaging process, of the position of the free corners formed during the stretching of the item of laundry at preferably diagonally opposite corners when the surface profile is determined. In this manner, the positions of the free corners formed during the stretching action can be calculated from the evaluation of the recorded image of the laundry item, if possible also as a three-dimensional image, thereby providing the spatial positions of the free corners formed by the stretching of the item of laundry, in particular their coordinates. From this it can also be established which of the free corners, adjacent to a particular held corner of the item of laundry, delimit a short or a long edge of the item of laundry. The item of laundry can then be gripped automatically in the way that it should be transferred to the following laundry-treatment arrangement, for example in the feed conveyor of a input device upstream of a mangle.

An apparatus for achieving the object set forth at the beginning is an apparatus for feeding items of laundry to a mangle or some other laundry-treatment arrangement with a transport system having moveable clamps for holding a respective corner of an item of laundry, characterized in that the transport system is assigned at least one imaging device for the purpose of generating a surface profile of an item of laundry. This apparatus is provided with an image-generating device in the course of the transport system for feeding single items of laundry to a laundry-treatment arrangement, in particular to a mangle or an input machine upstream thereof. It is therefore possible to record at least one surface profile of the item of laundry before the transport system and/or during its course, whereupon the item of laundry can be securely gripped. It is thereby possible to grip an arbitrary location on the item of laundry, but also a specific location, such as a corner.

As an alternative or in addition, image-generating devices can be provided at various positions along the course of the transport system which serve to direct differently moveable clamps or other types of gripping means of the transport system toward specific locations, in particular corners, on the item of laundry in a targeted manner and to grip them. Such processes as the rehanging of the item of laundry, the changing of clamps, the gripping of specific locations or corners of the item of laundry and/or the reorientation of the item of laundry can thereby be carried out automatically and reliably.

Individual or a plurality of image-generating devices are preferably located at various points of the transport system. These may be identical image-generating devices, each of which generate three-dimensional images, for example. But it is also conceivable, depending on the purpose of the task at hand, to configure each image-generating device differently. For example, image-generating devices, above all cameras, can be provided which generate three-dimensional images in some cases and two-dimensional images in other cases. It is also conceivable that the image-generating devices at specific points of the conveying section generate a surface profile of only one part of the item of laundry, namely only of that part whose position, orientation and/or configuration must be recorded in order to manipulate this part in the appropriate manner, in particular to grasp it.

A further apparatus for achieving the object set forth at the beginning, which can also be a preferred further development of the previously described apparatus, is an apparatus for feeding items of laundry to a laundry-treatment arrangement, characterized in that the transport system is assigned at least one pair of rollers for the passage of at least one part of an item of laundry and that the two rollers of the pair of rollers can rotate about parallel, upright axes of rotation. Accordingly, the transport system is assigned at least one pair of rollers for the passage of at least one part of an item of laundry between them, wherein the rollers of the pair of rollers can rotate about parallel upright axes of rotation. The axes of rotation can preferably run vertically, but can also run at a slight oblique angle to the vertical. The rollers form a gap resulting in the mechanical locating of a particular position, in particular of a corner, of the item of laundry drawn through the gap between the parallel rollers. The vertical or practically vertical orientation of the parallel axes of rotation of the two adjacent rollers facilitates the finding of the corner and the receiving of a section of the item of laundry that is moved past the rollers of the transport system. This part of the item of laundry, usually a rear part, thus unavoidably comes between the rollers with its most outer corner and can thus be reliably detected. This also applies when a clamp of the transport system grips a plurality of items of laundry at the same time. Then only a rear corner of an item of laundry is formed between the upright pair of rollers.

A preferred further development of the apparatus provides that the axes of rotation of the roller pair can be pivoted synchronously while maintaining their parallel alignment. Preferably the axes of rotation of the pair of rollers can be pivoted from an upright, i.e. vertical or nearly vertical alignment, to a horizontal or nearly horizontal alignment (and back). As a result, a part of the item of laundry can reliably pass between the initially upright rollers of the pair of rollers and, following the pivoting of the pair of rollers, the corner is aligned for easy gripping.

One advantageous arrangement of the apparatus provides that the rollers of the pair of rollers can be driven preferably to rotate in opposite directions, specifically and in particular at the same rotational speed. By stopping the drive, the found corner of the item of laundry can be held temporarily in a clamp-like manner until it is received by a clamp or some other retaining means, including, for example, a suction device.

BRIEF DESCRIPTION OF THE DRAWINGS

Preferred exemplary embodiments of the invention are described in more detail in the following as based on the drawings where.

DETAILED DESCRIPTION OF PREFERRED EMBODIMENTS

Figure 1:
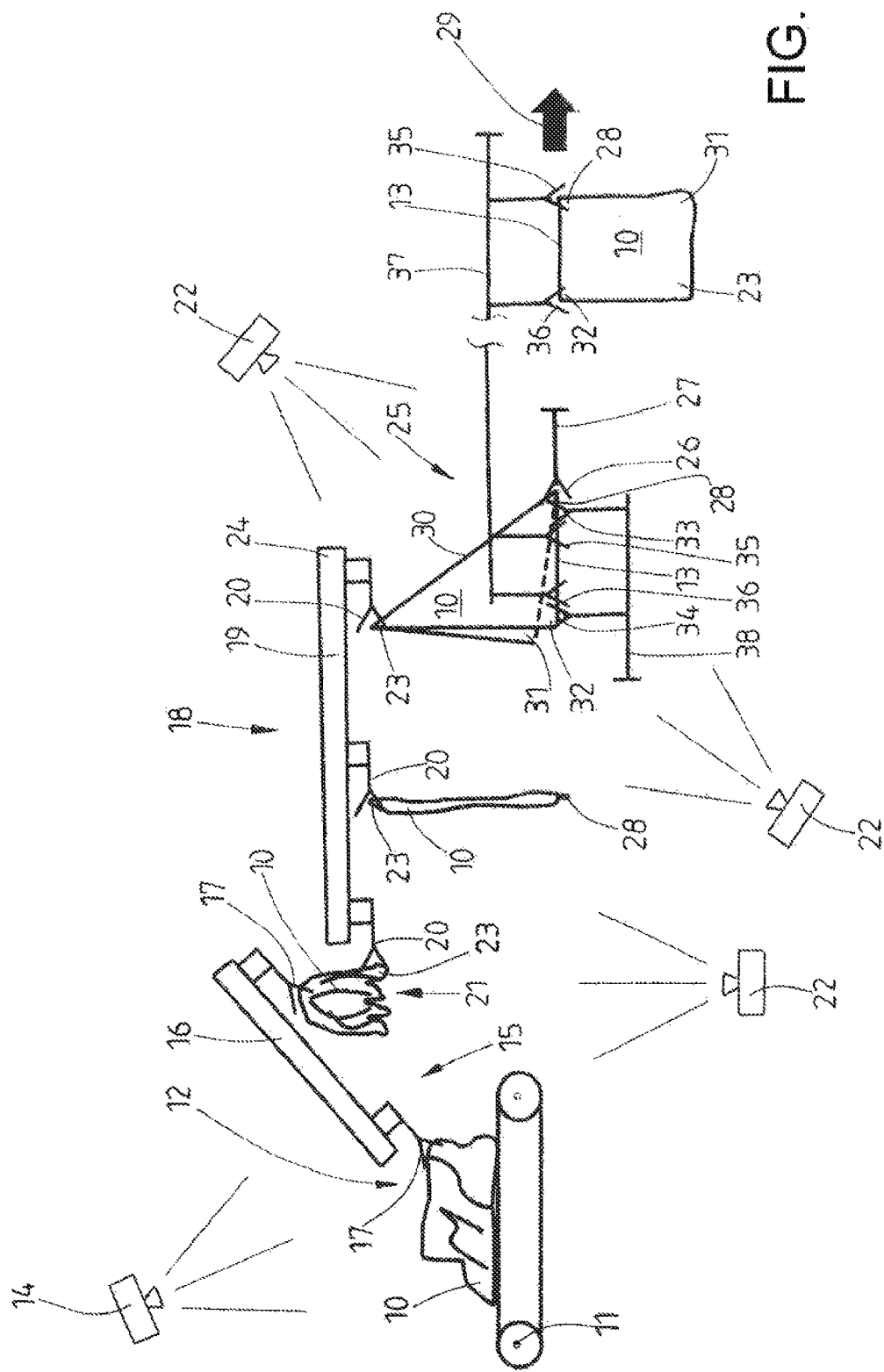
FIG. 1 shows a schematic representation of items of laundry being fed to a laundry-treatment arrangement.

The figures schematically illustrate different approaches for the automatic feeding of items of laundry to a laundry-treatment arrangement. For the purposes of the following description, it will be assumed that the laundry-treatment arrangement (not shown) is an input machine for feeding preferably spread-out items of laundry to a mangle. However, the invention is not limited to this.

A single, washed and at least partially dry item 10 of laundry that is not spread out and is arbitrarily oriented, for example in a jumbled fashion, or also a pile of washed and at least partially dried items 10 of laundry are transported to a receiving position 12 by means of a schematically represented conveyor 11 or other transport means. From this receiving position 12 a item 10 of laundry is in each case fed to the input machine (not shown) in a fully automated fashion with no accompanying manual assistance, preferably deposited on a feed conveyor of the input machine with at least a partially spread-out front edge 13, or transferred to the input machine on clamps, in particular spreading clamps.

Shown in FIG. 1 is a single item 10 of laundry situated in arbitrary orientation on the conveyor 11 of the receiving position 12. At the receiving position 12 an image is generated of the item 10 of laundry of irregular orientation by means of at least one shown camera 14. This is preferably a three-dimensional image. This image of the surface profile represents at least one part of a topography of the item 10 of laundry. In FIG. 1 only a single camera 14 is shown symbolically in the region of the receiving position 12. This may be a 3D camera or a laser scanner. But it is also conceivable to provide a plurality of cameras 14 at the receiving position 12, which are expediently distributed at different positions around the item 10 of laundry at the receiving position 12.

The receiving position 12 is assigned a gripping device 15 which in the shown exemplary embodiment has a rail 16 which is inclined obliquely upwards and which has two clamps 17 that can travel upwards along it in linear fashion. The clamps 17 grip alternately an item 10 of laundry at the receiving position 12. While one clamp 17 is receiving an item 10 of laundry at the receiving position 12, the other clamp 17 can transfer a previously gripped item 10 of laundry to another conveyor at an opposite and higher end region of the rail 16. But it is also conceivable that the gripping device 15 has only a single clamp or another type of gripping means, for example a suction device. The gripping device 15 can also be formed from a long-stroke cylinder. In this case, the gripping means 15 has only a single clamp 17.

The gripping device 15 is followed by a transport device 18. The transport device 18 shown here has a straight rail 19, which runs approximately horizontal in the shown exemplary embodiment. A plurality of preferably identical clamps 20 can travel on the rail 19 in a rectilinear fashion. An upper region of the rail 16 of the gripping device 15 and an end region of the rail 19 directed toward the rail 16 are located at a transfer point 21 in such a tight arrangement that a item 10 of laundry held by the clamp 17 can be received in the upper end region of the rail 16 by a clamp 20 at the end region of the rail 19 of the transport device 18 which points toward the gripping device 15.

The transfer point 21 between adjacent end regions of the rails 16 and 19 is also assigned at least one camera 22. For simpler presentation purposes, only one camera 22 is shown in FIG. 1, although a plurality of preferably identical cameras 22 can be provided at different positions. The at least one camera 22 can generate an image, preferably a three-dimensional image, of the item 10 of laundry at the transfer point 21. This image reproduces the surface profile or topography of at least one part of the item 10 of laundry in the region of the transfer point 21. Accordingly, the clamp 20 of the transport device 18 located in each case at the transfer point 21 can grip an arbitrary corner 23 of the item 10 of laundry.

The end 24 of the rail 19 of the transport device 18 situated opposite the gripping device 15 (shown to the right in FIG. 1) is located at a reorientation point 25. At this reorientation point 25 the item 10 of laundry held at a corner 23 by the clamp 20 initially hangs down freely. The surface profile or topography of the item 10 of laundry hanging down from the clamp 20 at the reorientation point 25 is in turn determined by at least one camera 22 to generate preferably a three-dimensional image. In the shown exemplary embodiment, two opposite, preferably identical cameras 22 are shown which record the surface profile or topography of the item 10 of laundry from opposite sides of the item 10 of laundry, preferably an outer side and an inner side.

Provided at the reorientation point 25 is a stretching clamp 26 which is traversable, preferably on a linear track 27. For example, for this purpose the stretching clamp 26 can be attached to a high-speed servo axis which in the simplest case is formed by a pneumatic cylinder. The stretching clamp 26 grips a corner 28 at the lowest point of the item 10 of laundry hanging down from the clamp 20. This lower corner 28 lies diagonally opposite the top corner held by the clamp 20.

Due to the stretching clamp 26 being moved in the feed direction 29 toward the input machine (not shown) while the clamp 20 remains stationary, the item 10 of laundry is at least somewhat or partially stretched, thus forming a diagonal fold 30 between the diagonally opposite corners 23 and 28. In the process, the remaining corners 31, 32 of the item 10 of laundry are formed, with the result that the image recorded by the cameras 22, which corresponds to the three-dimensional surface profile of the item 10 of laundry, can provide reliable detection or identification of the corners 31 and 32.

Provided at the reorientation point 25 below the item 10 of laundry is a pair of clamps comprising clamps 33, 34 that can moved toward and apart from each other. The clamps 33, 34 can be moved toward and apart from each other by means of appropriate linear drives. The clamps 33 and 34 are moved apart to the extent that they attain a distance from one another that allows them to still grip the corner 28 held by the clamp 26 and a corner 32 that has become free during the stretching of the item 10 of laundry. The clamps 33, 34 of the pair of clamps thereby hold two adjacent corners 28 and 32 of an edge of the item of laundry, which can possibly be the front edge 13.

In the shown exemplary embodiment, a second pair of clamps having the clamps 35, 36 is provided above the pair of clamps with the clamps 33, 34. The clamps 35, 36 can also be moved together and apart independently of each other, but can also be moved together along a preferably a straight conveying section 37 in the feed direction 29 while maintaining the same distance from one another. The clamps 35, 36 take the item 10 of laundry from the clamps 33, 34, specifically also at the corners 28 and 32. The item 10 of laundry is then held at opposite corners 28 and 32 of the front edge 13 in a spread-out or partially spread-out position, i.e. in a preliminary spread-out position. The item 10 of laundry thereby hangs down from the clamps 35 and 36 and can be transported along the conveying section 37 to the input machine (not shown).

It is conceivable that the pair of clamps comprising the clamps 35, 36 or the pair of clamps comprising the clamps 33, 34 can be omitted. In that case, no transfer from one pair of clamps to the other occurs at the reorientation point. Instead, the item 10 of laundry held on the corners 28 and 32 is directly transported to the input machine in the feed direction 29 by the clamps 33, 34 or 35, 36.

The method according to the invention is implemented by the previously described apparatus as shown in FIG. 1 as follows:

Either a single item 10 of laundry or a pile of a plurality of items 10 of laundry is transported by the conveyor 11 to the receiving position 12. At the receiving position 12 a plurality of items 10 of laundry are immediately separated out in the process. Even when only a single item 10 of laundry is transported to the receiving position 12, this item is disordered, in particular crumpled. For that reason, at least one camera 14 at the receiving position 12 records preferably a three-dimensional image of the surface profile or topography of the item 10 of laundry. This results in a three-dimensional image of the structure or topography of the item 10 of laundry lying on the conveyor 11. The three-dimensional image of the at least one item 10 of laundry at the receiving position 12 is preferably electronically processed and evaluated by image processing. Above all, a determination is made as to which location on the item 10 of laundry on the conveyor 11 can best be gripped. For this purpose, preferably the location of the largest curvature gradient of the item 10 of laundry at the receiving position 12 is determined electronically or computationally, and the coordinates of this location are set. Accordingly, the clamp 17 of the gripping device 15 is moved in a targeted manner toward the location that can be conveniently gripped and the item 10 of laundry is gripped here.

The three-dimensional image or surface model of the item 10 of laundry that is recorded by the at least one camera 14 extends in three dimensions or spatial directions, namely in an X, Y and Z direction or axis. This makes it possible to grip any form that the arbitrarily positioned item 10 of laundry assumes. In particular, this makes it possible to determine the heights and recesses of the item 10 of laundry, thereby allowing conclusions to be made concerning the surface profile, in particular the topography, of the item 10 of laundry.

The at least one camera provides a stereoscopic, three-dimensional image of the topography or surface profile of the item 10 of laundry. This is particularly the case when the item 10 of laundry is viewed by a plurality of cameras 14 placed at various viewing angles. By means of the special imaging of the item 10 of laundry using two cameras 14 or more than two cameras 14 set at different viewing angles, it is possible to create a three-dimensional, spatial image and/or surface model in that three-dimensional coordinates are assigned to every point on the surface of the item 10 of laundry. This can be carried out by image processing or further image processing, for example by means of a computer.

It is sufficient if the at least one camera 14 records an image of the item 10 of laundry or of the pile containing a plurality of items 10 of laundry and this image is analyzed.

But it is also conceivable to record images continuously or to record an image at regular intervals, and then to compare these images appropriately.

After the topography or the surface profile of the item 10 of laundry, of a plurality or, preferably, all of the visible items 10 of laundry in the pile of laundry has been established by electric and/or computational image analysis, it is possible to identify at least one location which is particularly suited for the gripping or separating out of the item 10 of laundry. Such a location is preferably a region where the item 10 of laundry exhibits a large curvature or a large curvature gradient. For example, this can be a fold, a crease, an edge or a corner of the item 10 of laundry. This suitable location is calculated by image analysis of the recorded topography or of the recorded surface profile of the item 10 of laundry using a computer, for example. This can be done such that, for two respectively adjacent points, the angle between two tangents or tangential planes of these points is determined. If this angle is acute or if the tangents do not intersect, one can assume a large curvature or a large curvature gradient. Such a location is then particularly suitable for gripping and/or separating the item 10 of laundry.

The coordinates of the preferred location on the item 10 of laundry automatically determined by computational image processing are likewise calculated and transferred to the drive, preferably to the high-speed servo axis of the clamp 17 so that the clamp 17 of the gripper can be moved precisely to the calculated, preferred location on the item 10 of laundry. If a plurality of locations on the item 10 of laundry are determined to be suitable for gripping, that location is chosen which can be approached most quickly by the gripper 14, in particular the one with the shortest travel path.

In the shown exemplary embodiment, the location that has been derived from the image recorded by the at least one camera 14 represents an arbitrary location on the item 10 of laundry. It is also conceivable that the analysis of the recorded image, in particular of the three-dimensional image, is conducted such that a corner of the item 10 of laundry is identified, with this corner being grasped in a targeted manner by the clamp 17 of the gripping device 15.

According to the shown exemplary embodiment, after the clamp 17 of the gripping device 15 has grasped the item 10 of laundry at an arbitrary location that is particularly suited for gripping, it is moved away from the receiving position 12 by means of the clamp 17 moving along the rail 16 and slightly lifted. At the upper end of the rail 16 the item 10 of laundry is recorded by at least one camera 22, preferably once again as a three-dimensional image. As a result of the appropriate analysis of the surface profile of the item 10 of laundry reproduced in this image, a corner 23 of the item 10 of laundry still hanging on the clamp 17 is identified from the surface profile or topography of the item 10 of laundry as determined by the at least one camera 22 and gripped by a clamp 20 of the transport device 18. The clamp 17 of the gripping device 15 is subsequently opened so that the item 10 of laundry hangs down by the corner 23 from the clamp 20.

Due to the clamp 20 travelling along the rail 19 of the transport device 18, the item 10 of laundry hanging down from said clamp 20 is moved from the transfer point 21 between the gripping device 15 and the transport device 18 to the reorientation point 25. Here the lowest point of the item 10 of laundry hanging down from the clamp 20 and the farthest away from the latter is gripped by the stretching clamp 26. Because the lowest point of the item 10 of laundry is a corner 28 located diagonally opposite to the corner 23, the stretching clamp 26 necessarily grips the corner 28 of the item 10 of laundry which lies diagonally opposite the upper corner 23. As a result of the stretching clamp 26 being moved on the track 27 in the feeding direction 29, the item 10 of laundry is now stretched, preferably only lightly stretched, between the diagonally opposing corners 23 and 28, with the corners 23 and 28 thereby being drawn apart. Preferably the corners 23 and 28 are drawn apart to the extent that the item 10 of laundry between these corners 23 and 28 is only slightly tautened but not subjected to any appreciable mechanical loads. When the diagonally opposite corners 23 and 28 are drawn apart by the movement of the stretching clamp 26, the diagonal fold 30 is formed in the item 10 of laundry between these corners 23 and 28. At the same time, this causes the formation of the other corners 31 and 32 of the item 10 of laundry such that said corners can be clearly registered and imaged by the cameras 22 assigned to the reorientation point 25.

By means of an analysis of the image recorded by the cameras 22 or, if applicable, by only one camera 22 of the stretched item 10 of laundry, the positions of the corners 31 and 32 can be determined computationally. Of the corners 31 and 32 thus determined, either a corner 31 or 32 is gripped which can be most easily gripped or, in the case of a rectangular item 10 of laundry, a corner 31 or 32 is gripped which, together with the corner 28 held by the stretching clamp 26, borders the intended front edge 13 of the item 10 of laundry, namely either a transverse edge or a longitudinal edge.

As shown in the exemplary embodiment of FIG. 1, the clamp 34 grips the corner 32 adjacent to the corner 28 which is part of a transverse edge of the item 10 of laundry. In this case, the item 10 of laundry is fed to the input machine, with the shorter transverse edge being its leading front edge 13, and deposited on the feed conveyor of the input machine. If the item 10 of laundry is to be fed to the input machine with the longer longitudinal edge as its leading edge, the clamp 34 grips the other corner 31 formed when the item 10 of laundry is stretched out.

The clamps 33 and 34 of the pair of clamps can be purposefully moved along a preferably straight conveying section 38 to the corners 28 and 32, wherein the movement of the clamp 34 to the corner 32, which becomes free or is formed when the item of laundry is stretched, is controlled on the basis of a computational analysis of the three-dimensional image of the item of laundry as recorded by the at least one camera 22 at the reorientation point 25.

In the shown exemplary embodiment a second pair of clamps is provided as clamps 35 and 36 above the clamps 33 and 34. The clamps 35 and 36 receive the front edge 13 at its corners 28 and 32 from the clamps 33 and 34. The item 10 of laundry which subsequently hangs with its corners 32 and 28 under the clamps 35, 36 is now transported along the conveying section 37 in the feed direction 29 to the input machine and is preferably either deposited directly on the feed conveyor of the input machine or transferred by spreading clamps to the input machine.

At the reorientation point 25, the at least one camera 22 is also used to determine, in the case of a hemmed item 10 of laundry, on which side of the item of laundry the narrow marginal strips of the item 10 of laundry which form the hem are located. Particularly in the case of table linen the hem side of the item 10 of laundry, i.e. the side on which the folded-over narrow marginal edge of the item 10 of laundry is located, must be fed into a mangle such that the hem side comes into contact with the mangle roller but not with the ironing surface of the mangle trough when it is standing idle. Because it is possible to determine, using the at least one camera 22, on which side of the item 10 of laundry viewed by the cameras 22 the hem is located, the item 10 of laundry can be fed to the input machine by the selective feeding to the input machine with the corners 28 and 32 hanging on the clamps 33, 34 or 35, 36 in the correct orientation for mangling.

If only one pair of clamps, either clamps 33, 34 or clamps 35, 36, are provided at the reorientation point 25, the item 10 of laundry can be also be reoriented, on the basis of the position of the hem as recorded by the at least one camera 22, by altering the sequence of the clamps 35, 36 or 33, 34 by having one clamp overtake the other clamp along the conveying section 37 or 38, for example.

Figure 2:
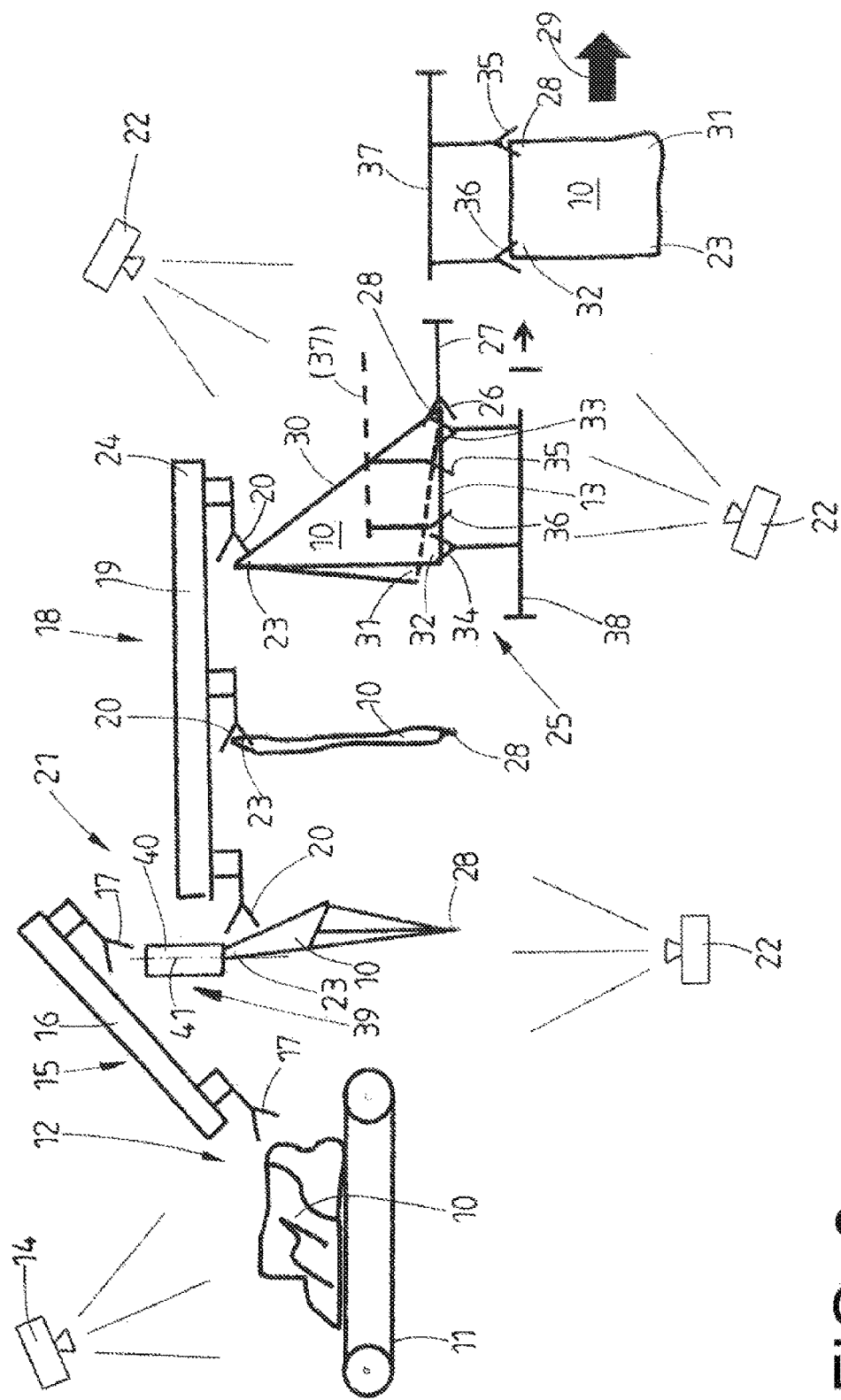
FIG. 2 shows a schematic representation analogous to FIG. 1 of a second exemplary embodiment of the invention.

FIG. 2 shows an apparatus which essentially corresponds to the previously described apparatus and as such the same designation numbers are used to indicate the same parts of the apparatus. In the apparatus of FIG. 2 a pair of rollers 39 is provided at the transfer point 21. The pair of rollers 39 has two adjacent, upright rollers 40, of which only the roller 40 at the front is shown in FIG. 2. The two identical rollers 40 can rotate about parallel, vertical axes of rotation 41. Formed between the rollers 40 is a small gap for the passage of at least one part of the item 10 of laundry.

In the shown exemplary embodiment the parallel uprights rollers 40 can be driven in opposite directions in such a way that they transport the item 10 of laundry or only a part of it through the gap between the adjacent rollers. It is also conceivable that only one of the two parallel rollers 40 is driven, with the second roller 40 rotating freely when an item 10 of laundry is transported between the rollers 40.

The item 10 of laundry is dropped by opening the clamp 17 above the rollers 40, whereby due to the upright arrangement of the rollers 40 the item 10 of laundry enters the gap between the rollers 40 and is transported transversely through the gap. As soon as the item 10 of laundry has been transported almost completely through the gap between the rollers 40, with only a rear tip or a rear corner, preferably the corner 28, still hanging in the gap, this is determined by means of an appropriate detection means and correspondingly the clamp 20 of the transport device 18 is controlled such that it grips the item 10 of laundry at its rear tip or the rear corner, specifically either when its outermost corner or outermost tip is still located in the gap between the rollers or immediately after the rearmost tip or rearmost corner of the item 10 of laundry has left the gap between the rollers 40.

It is conceivable to arrange the axes of rotation 41 of the two adjacent rollers 40 at a slightly oblique opposing angle to one another such that a downward tapered and slightly V-shaped gap is created between the rollers 40.

It is also conceivable that the gap between the rollers 40 is closed at the bottom by a transverse beam under the rollers 40 or by a transversely directed, horizontal roller located in front of or behind the two parallel rollers 40.

Figure 3:
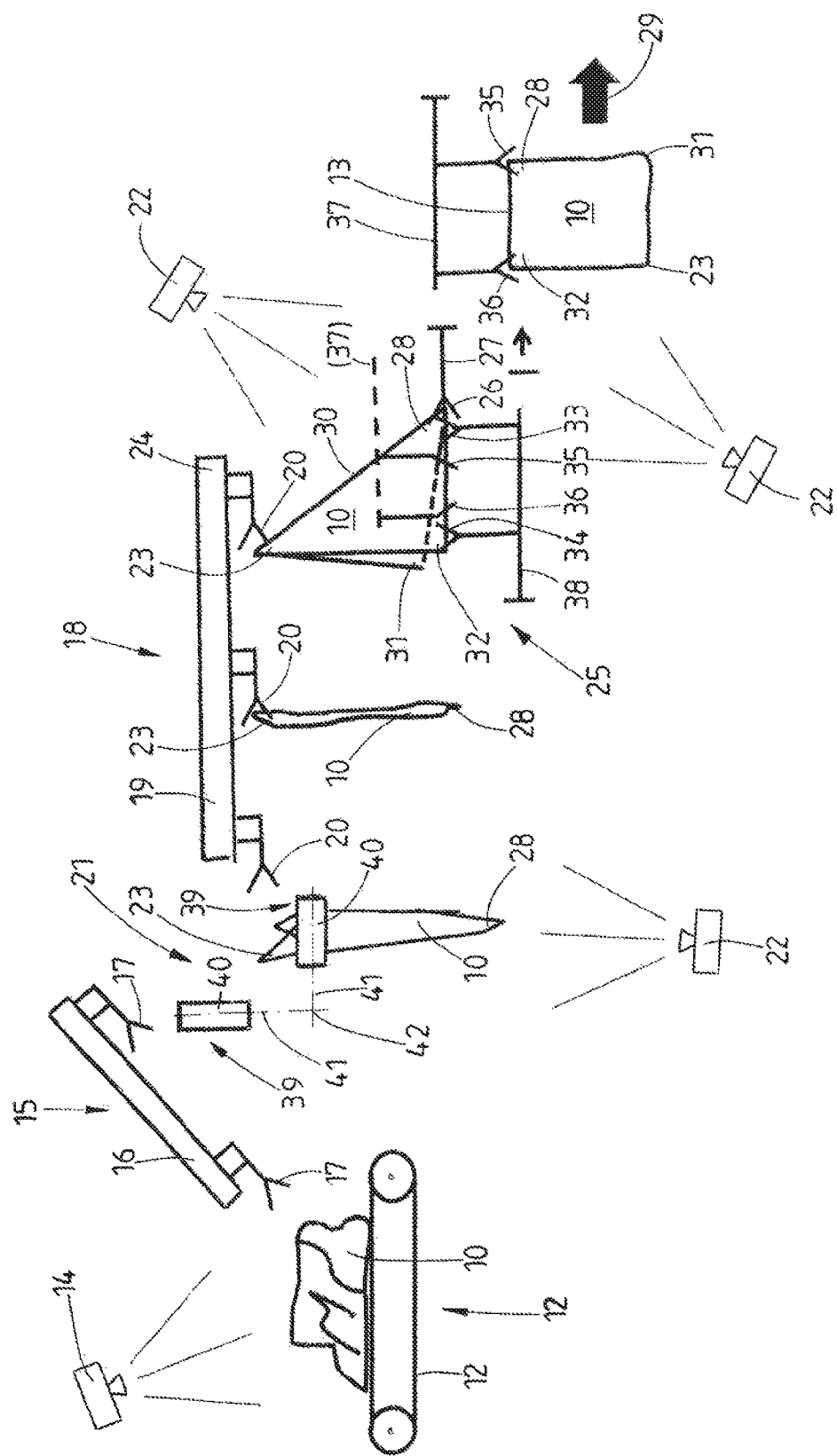
FIG. 3 shows a schematic representation analogous to FIGS. 1 and 2 of a third exemplary embodiment of the invention.

FIG. 3 shows a modified version of the apparatus shown in FIG. 2. In this modification the pair of adjacent rollers is pivotable. Specifically, the rollers 40 can be pivoted together about their axes of rotation 41 from an initial position with vertical axes of rotation 41 to a position with approximately horizontal axes of rotation 41. The rollers 40 are pivoted about a horizontal pivoting axis 42 which runs through the axes of rotation 41 of both rollers 40 and is located at a distance below the rollers 40. In the shown exemplary embodiment the rollers 40 can be pivoted equally by about 90°.

In the upward pivoted initial position of the rollers 40 the axes of rotation 41 run vertically, but can also run at a slight oblique angle to the vertical. It is in this initial position of the rollers 40 that an item 10 of laundry is dropped from the clamp 17 over the rollers 40. The item 10 of laundry thereby enters into the gap between the vertical or nearly vertically oriented rollers 40. The rollers 40 are subsequently pivoted equally in common about their horizontal pivoting axes 42 by approximately 90° so that the rollers 40 reach a horizontal or nearly horizontal position. In this horizontal position the rollers 40 are driven in opposing directions until a rearmost—and due to the pivoting of the rollers 40 into the horizontal position—upper tip or a corner 23 is still located between the rollers 40, i.e. with a major portion of the item 10 of laundry having just been transported through the rollers 40. If appropriate, the drive of the rollers 40 can be stopped. The corner 23 of the item 10 of laundry is thereby purposefully located above the rollers 40 in that the corner 23 projects approximately upwards from the gap between rollers 40. The item 10 of laundry can then be securely gripped by the clamp 20 of the transport device 18 at this corner 23 and taken away. In the process the item 10 of laundry can be drawn out of the gap between the rollers 40. It is also conceivable to release the item 10 of laundry by opening the gap between the rollers 40 or to move the item 10 of laundry out of the gap by driving the rollers 40 in opposite directions. This can also be performed in such a manner that the rollers 40 are driven to rotate in opposite directions after the corner 23 of the item 10 of laundry has been gripped by the clamp 20.

After the item 10 of laundry has been taken away from the two parallel rollers 40 by means of the transport device 18 and thus freeing up the rollers 40, the latter are pivoted back into their initial vertical position in order to receive a next item 10 of laundry.

The automated process of finding the corner using the previously described pair of parallel rollers 40 can also be provided at any other locations of the apparatuses shown and described in exemplary fashion in FIGS. 1 to 3. It is also conceivable to employ the automated process of finding the corner between two parallel rollers 40 at other sites in the region of the laundry than those shown in FIGS. 1 to 3.

LIST OF DESIGNATIONS 10 laundry article
11 conveyor
12 receiving position
13 front edge
14 camera
15 gripping device
16 rail
17 clamp
18 transport device
19 rail
20 clamp
21 transfer point
22 camera
23 corner
24 end
25 reorientation point
26 stretching clamp
27 track
28 corner
29 feed direction
30 diagonal fold
31 corner 32 corner
33 clamp
34 clamp
35 clamp
36 clamp
37 conveying section
38 conveying section
39 pair of rollers
40 rollers
41 axis of rotation
42 pivot axis

What is claimed is:

1. A method for feeding items of laundry to a mangle or to some other laundry-treatment arrangement, comprising:
recording a surface profile of an item of laundry, from which a location to be gripped on the item of laundry is determined, and then gripping the item of laundry gripped at this location,
wherein when the item of laundry is gripped, the item of laundry is spread out at two adjacent corners of a front edge of the item of laundry and the item of laundry is deposited with the front edge on a feed conveyor which transports the item of laundry to the mangle or to some other laundry-treatment arrangement, and
wherein the surface profile of the item of laundry is determined by at least one imaging process.

2. The method as claimed in claim 1, wherein the imaging process is at least one three-dimensional imaging process.

3. The method as claimed in claim 1, wherein the item of laundry is gripped at a location where, in accordance with the determined surface profile, the item of laundry exhibits the greatest curvature gradient.

4. The method as claimed in claim 1, wherein the item of laundry is gripped at one of the corners that, on the basis of an analysis of the determined surface profile, is most suitable for gripping the item of laundry for spreading out the item of laundry.

5. The method as claimed in claim 1, wherein the surface profile of the item of laundry, supplied to the method hanging on a retaining means, is determined and, on the basis of the determined surface profile, one of the corners of the item of laundry is gripped in a targeted manner.

6. The method as claimed in claim 1, further comprising, on the basis of the determined surface profile of the item of laundry, using the imaging process to ascertain the orientation of a hem of the item of laundry and, on the basis of the determined orientation of the hem, feeding the item of laundry to the laundry-treatment arrangement in an alignment corresponding to a preferred position of the hem.

7. The method as claimed in claim 1, wherein for an item of laundry that is supplied to the method hanging down from a held corner, a lowest corner of the item of laundry is gripped and spread out, wherein the other corners of the item of laundry are formed such that they assume positions that can be gripped.

8. A method for feeding items of laundry to a mangle or to some other laundry-treatment arrangement, comprising:
for an item of laundry that is supplied to the method hanging down from a held corner of the item of laundry, gripping a lowest corner of the item of laundry and spreading out the item of laundry, whereby other corners of the item of laundry are formed such that the other corners assume positions that can be gripped,
wherein when the item of laundry is gripped and the item of laundry is spread out at two adjacent corners, namely the lowest corner and one of the other corners that is adjacent to the lowest corner, of a front edge of the item of laundry, the front edge being located between the lowest corner and the one of the other corners that is adjacent to the lowest corner, the item of laundry is transported with the front edge as a leading edge to the laundry-treatment arrangement.

9. The method as claimed in claim 8, wherein the item of laundry is spread out at diagonally opposite corners, namely the held corner and the lowest corner, and of the other corners thus formed, selecting one of the other corners that is adjacent to the held corner and the lowest corner, both of which are now held corners.

10. The method as claimed in claim 9, wherein, for the item of laundry that is held at the diagonally opposite corners, one of the other corners formed during the spreading out process is gripped and at least the held corner is released.

11. The method as claimed in claim 10, wherein, for the item of laundry that is held at the diagonally opposite corners, one of the other corners formed during the spreading out process is gripped which is intended to be part of the front edge of the item of laundry.

12. The method as claimed in claim 8, wherein the positions of the other corners formed during the spreading out of the item of laundry are determined by the determination of the surface profile.

13. The method as claimed in claim 8, wherein at least one position of the other corners formed during the spreading out of the item of laundry are determined by an imaging method.

14. An apparatus for feeding items of laundry to a mangle or some other laundry-treatment arrangement with a transport system having moveable clamps for holding a respective corner of an item of laundry, wherein the transport system is assigned at least one imaging device for the purpose of generating a surface profile of an item of laundry.

15. The apparatus as claimed in claim 14, wherein imaging devices are arranged at various positions of the transport system where a corner of the item of laundry is gripped.

16. The apparatus as claimed in claim 14, wherein the transport system is assigned at least one pair of rollers for the passage of at least one part of an item of laundry and that the two rollers of the pair of rollers are rotatable about parallel, upright axes of rotation.

17. The apparatus as claimed in claim 16, wherein the transport system is assigned at least one pair of rollers for the passage of at least one part of an item of laundry and that the two rollers of the pair of rollers are rotatable about axes of rotation that are brought at least into a nearly upright position.

18. An apparatus for feeding items of laundry to a laundry-treatment arrangement, wherein the transport system is assigned at least one pair of rollers for the passage of at least one part of an item of laundry, wherein the two rollers of the pair of rollers are rotatable about parallel axes of rotation that is brought at least into a nearly upright position, and wherein the axes of rotation of the rollers of the pair of rollers are pivotable synchronously while maintaining a parallel alignment to each other.

19. The apparatus as claimed in claim 18, wherein the axes of rotation of the rollers of the pair of rollers are pivotable from an at least nearly upright alignment to an at least nearly horizontal alignment while maintaining the parallel alignment.

20. The apparatus as claimed in claim 18, wherein the rollers of the pair of rollers are drivable to rotate in opposite directions.

21. The apparatus as claimed in claim 20, wherein the rollers of the pair of rollers are drivable to rotate at the same rotational speed.

22. The method as claimed in claim 7, wherein the item of laundry is spread out at diagonally opposite corners, namely the held corner and the lowest corner, and of the other corners thus formed, selecting one of the other corners that is adjacent to the held corner and the lowest corner, both of which are now held corners.

23. The method as claimed in claim 7, wherein, for the item of laundry that is held at the diagonally opposite corners, one of the other corners formed during the spreading out process is gripped and at least the held corner is released.

24. The method as claimed in claim 23, wherein, for the item of laundry that is held at the diagonally opposite corners, one of the other corners formed during the spreading out process is gripped which is intended to be part of the front edge of the item of laundry.

* * * * *